United States Patent
Koo et al.

(10) Patent No.: US 7,827,640 B2
(45) Date of Patent: Nov. 9, 2010

(54) SHOE OUTSOLE MADE USING COMPOSITE SHEET MATERIAL

(75) Inventors: John Koo, Los Angeles, CA (US); Jonathan Goldberg, Los Angeles, CA (US)

(73) Assignee: Dynasty Footwear, Ltd., El Segundo, CA (US)

( * ) Notice: Subject to any disclaimer, the term of this patent is extended or adjusted under 35 U.S.C. 154(b) by 0 days.

(21) Appl. No.: 12/408,702

(22) Filed: Mar. 22, 2009

(65) Prior Publication Data

US 2009/0178307 A1 Jul. 16, 2009

Related U.S. Application Data

(62) Division of application No. 11/751,581, filed on May 21, 2007, now Pat. No. 7,516,506.

(60) Provisional application No. 60/803,351, filed on May 26, 2006, provisional application No. 60/896,315, filed on Mar. 22, 2007.

(51) Int. Cl.
*A43B 13/14* (2006.01)

(52) U.S. Cl. .................. 12/146 B; 12/146 BR; 36/59 R; 36/25 R

(58) Field of Classification Search ............... 12/146 B, 12/146 BR; 36/59 R, 25 R, 32 R
See application file for complete search history.

(56) References Cited

U.S. PATENT DOCUMENTS

| | | | |
|---|---|---|---|
| 1,811,803 A | 6/1931 | Oakley | |
| 2,287,282 A * | 6/1942 | Tousley | 264/130 |
| 2,333,303 A | 11/1943 | Enos | |
| 2,371,689 A | 3/1945 | Gregg et al. | |
| 3,007,205 A * | 11/1961 | House | 264/171.24 |
| 3,303,250 A | 2/1967 | Bingham, Jr. | |
| 3,888,026 A | 6/1975 | Dassler | |
| 4,055,699 A * | 10/1977 | Hsiung | 36/44 |
| 4,250,306 A | 2/1981 | Lask et al. | |
| 4,497,871 A | 2/1985 | Henke | |
| 6,660,205 B1 | 12/2003 | Harkins, Sr. | |
| 6,900,547 B2 | 5/2005 | Polk Jr. et al. | |
| 2003/0121179 A1 * | 7/2003 | Chen | 36/30 R |
| 2003/0171049 A1 | 9/2003 | Arnold et al. | |
| 2004/0194341 A1 | 10/2004 | Koo | |

(Continued)

FOREIGN PATENT DOCUMENTS

EP 0516874 A1 12/1992

(Continued)

OTHER PUBLICATIONS

"Extrusion", definition from Wikipedia, printed out from http://en.wikipedia.org/wiki/Extrusion on May 16, 2007.

(Continued)

*Primary Examiner*—Ted Kavanaugh
(74) *Attorney, Agent, or Firm*—Joseph G. Swan, P.C.

(57) ABSTRACT

Provided are, among other things, systems, methods and techniques for making a shoe outsole and to shoe outsoles made using such techniques. In one such technique, a sheet of composite material is produced by extruding a base material together with a sheet of fabric material. The sheet of composite material is then cut into an outsole component, and a shoe outsole is fabricated using the outsole component.

17 Claims, 6 Drawing Sheets

U.S. PATENT DOCUMENTS

2004/0194345 A1  10/2004  Koo
2008/0230942 A1*  9/2008  Koo  .................... 264/171.13

FOREIGN PATENT DOCUMENTS

| JP | S61-225380 | 10/1986 |
|---|---|---|
| JP | 2000308501 | 11/2007 |

OTHER PUBLICATIONS

"Plastics extrusion", definition from Wikipedia, printed out from http://en.wikipedia.org/wiki/Plastics_extrusion on May 16, 2007.

International Search Report and Written Opinion of the International Searching Authority in parent's corresponding PCT application PCT/US07/69410, mailed Aug. 14, 2008.

\* cited by examiner

SHOE OUTSOLE MADE USING COMPOSITE SHEET MATERIAL

This application is a division of U.S. patent application Ser. No. 11/751,581, filed May 21, 2007, now U.S. Pat. No. 7,516,506, which in turn claims the benefit of U.S. Provisional Patent Application Ser. No. 60/803,351, filed on May 26, 2006, and titled "Sheet Material with Embedded Fibers or Fabric Material" and U.S. Provisional Patent Application Ser. No. 60/896,315, filed on Mar. 22, 2007, and titled "Composite Sheet Material". All of the foregoing applications are incorporated by reference herein as though set forth herein in full.

FIELD OF THE INVENTION

The present invention pertains to footwear and, more particularly, to shoe outsoles and to methods for making shoe outsoles.

BACKGROUND

A variety of different techniques for making shoe soles exist. Examples include injection molding the sole as a unitary piece, bonding layers of different material together to form the shoe's sole and use of vulcanization techniques.

In addition, a variety of different processing techniques have been used to provide the shoe's sole with particular characteristics and/or to obtain advantageous import duty rates that typically apply to shoes having an outsole in which at least 50% of the ground-contacting surface is made of a natural material. Examples of such processing techniques include molding fabric or other natural materials into the shoe's outsole and flocking the shoe's outsole with natural fabric fibers.

However, improvements in the structures of shoe outsoles, as well as the production techniques for making them, remain desirable.

SUMMARY OF THE INVENTION

The present invention addresses this need by providing shoe outsoles and techniques for making shoe outsoles which utilize a composite sheet material (e.g., fabric or fabric fibers embedded into a base material).

Thus, in one aspect the invention is directed to systems, methods and techniques for making a shoe outsole and to shoe outsoles made using such techniques. In one such technique, a sheet of composite material is produced by extruding a base material together with a sheet of fabric material. The sheet of composite material is then cut into an outsole component, and a shoe outsole is fabricated using the outsole component.

In another, a base material is extruded into a sheet of base material. Then, individual fibers are deposited onto a surface of the sheet of base material before the sheet of base material has fully hardened. The fibers are pressed into the surface of the sheet of base material in order to form a sheet of composite material, and the sheet of composite material is cut into an outsole component. Finally, a shoe outsole is fabricated using the outsole component.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

Generally speaking, the present invention pertains to a composite sheet material that has a plurality of individual fibers or a piece of fabric material embedded within a non-fibrous base material, to techniques for manufacturing such a composite sheet material, to the use of such a composite sheet material in the construction of a shoe outsole, and to shoe outsoles made using such techniques.

In this regard, it often is desirable to manufacture a shoe sole having a composite surface, including some areas in which one type of material contacts the ground and other areas in which another type of material contacts the ground. For example, the first type (e.g., the shoe outsole's base material) might be a synthetic rubber or other polymer that ordinarily is used as a material for forming a shoe's outsole, while the second type might be a plurality of natural or synthetic fibers or a piece of natural or synthetic fabric. In the present disclosure, the term "fabric material" is used in its normal sense of referring to a woven or non-woven material that resembles cloth, with its individual fibers bound together, while the term "fibers" refers to distinct particles or strands that generally are not bound together.

The techniques of the present invention can be applied with respect to either individual fibers or fabric material. Such individual fibers and fabric material collectively are referred to herein as "fibrous material".

Figure 1:
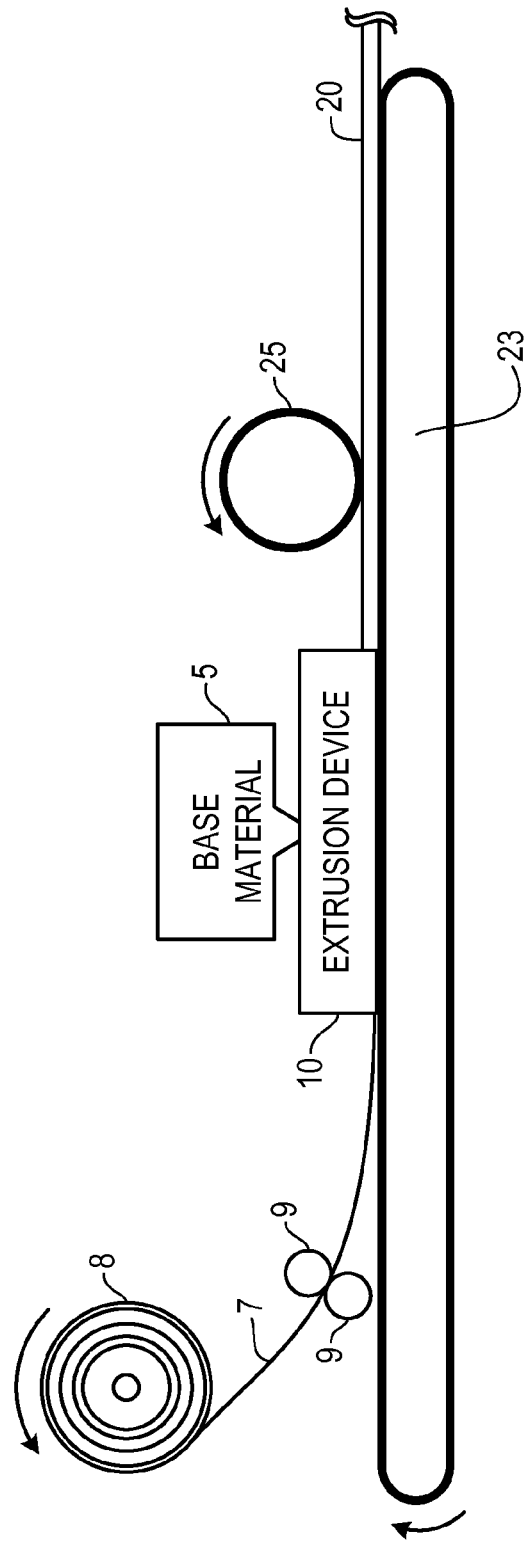
FIG. 1 is a right side conceptual view of a system for making a composite sheet material according to a first representative embodiment of the present invention.

Specifically, the present invention contemplates two general categories of manufacturing such a composite material. In the first, an example of which being illustrated in FIG. 1, both a non-fibrous material (the base material 5) and a fibrous material (fabric sheet material 7 taken from roll 8 and guided using guiding rollers 9) are fed together through an extrusion device 10 (e.g., a conventional extrusion device that ordinarily is used for manufacturing sheets of non-fibrous material). Various kinds of fabric sheet material 7 that may be used are mentioned above. The base material 5 can include, e.g., polyvinyl chloride (PVC), acrylonitrile butadiene styrene (ABS), thermoplastic rubber (TPR), ethylene vinyl acetate (EVA), a polyurethane elastomer, natural or synthetic rubber, synthetic leather, any polymer or any type of plastic.

A conventional extrusion device 10 typically is used to fabricate long objects of a fixed cross-sectional profile, such as plastic sheet material, by pushing and/or drawing liquid or semi-liquid material through a die of the desired profile shape. As noted above and as shown in FIG. 1, the present embodiment of the invention modifies the conventional process, in part, by feeding fabric sheet material 7 through the extrusion device 10 together with the liquid or semi-liquid base material 5. As the composite sheet material 20 exits extrusion device 10, it typically is carried along a conveyor 23, cooled or otherwise allowed or forced to harden, and then cut to the desired length. One or more rollers 25 also may be used for additional shaping and/or for facilitating the cooling process of the composite sheet material 20 that is produced by extrusion device 10.

According to the present embodiment of the present invention, where a fabric material 7 is being used to produce the composite sheet material 20, the fabric material preferably is fed through the extrusion die and/or underneath the roller 25 together with the liquid or semi-liquid non-fibrous base material 5, so that the resulting material 20 has the desired composite composition. Preferably, the fabric material 7 is inserted underneath the liquid or semi-liquid non-fibrous base material 5, so that once the non-fibrous base material 5 hardens, the desired composite sheet of material 20 will result.

Figure 2:
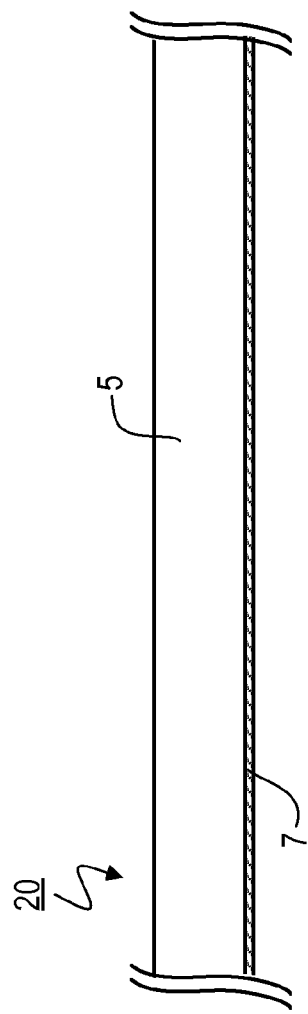
FIG. 2 illustrates a sectional view of a sample composite sheet material according to the first representative embodiment of the present invention.

In the foregoing embodiment, fabric sheet material 7 is embedded into a preferably non-fibrous material 5. An example of the resulting composite sheet material 20 is illustrated in FIG. 2. As shown, the top layer of composite sheet material 20 is made of the base material 5, and the bottom layer consists largely of the fabric sheet material 7, with the layer of base material 5 ordinarily being significantly thicker than the layer of fabric sheet material 7.

Figure 3:
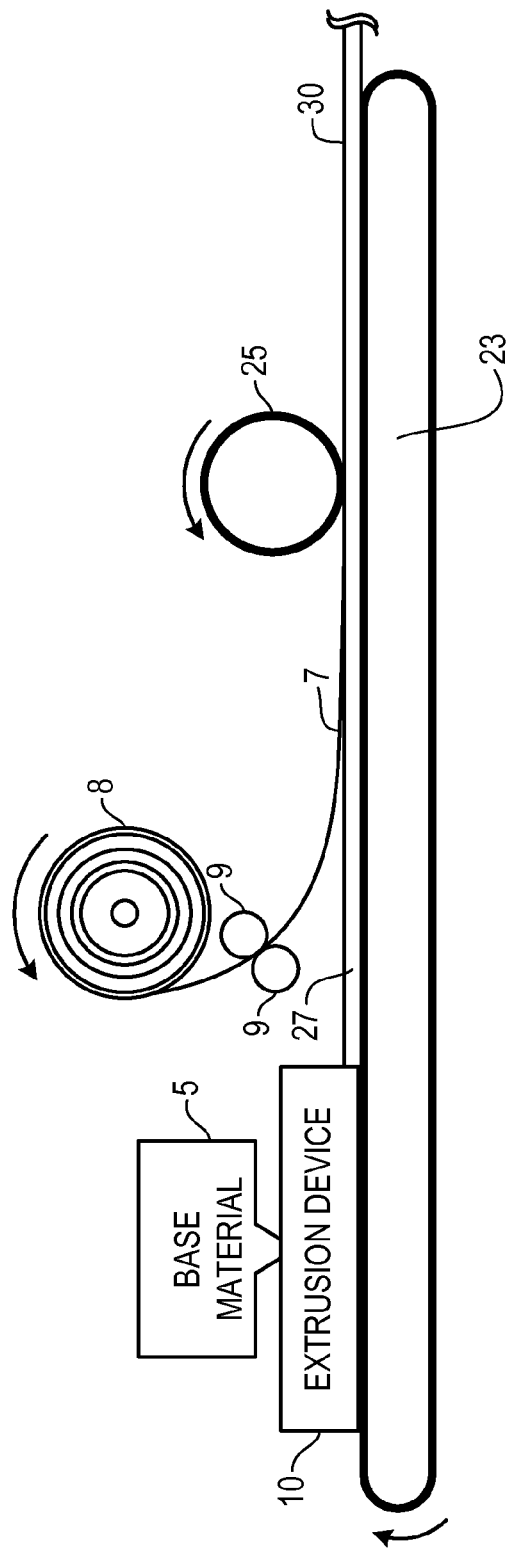
FIG. 3 is a right side conceptual view of a system for making a composite sheet material according to a second representative embodiment of the present invention.
Figure 4:
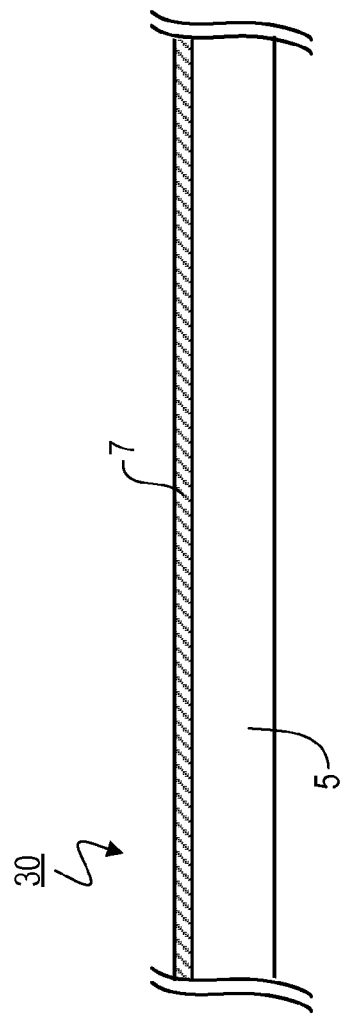
FIG. 4 illustrates a sectional view of a sample composite sheet material according to the second and third representative embodiments of the present invention.

However, in alternate embodiments, the sheet of fabric material 7 is pressed onto the non-fibrous base material 5 after the non-fibrous base material 5 has exited the extrusion die and/or roller 25 and is still in a liquid or semi-liquid state, i.e., in an uncured state. One example of this is shown in FIG. 3. In this embodiment, the sheet of fabric material 7 is laid onto an extruded sheet 27 made entirely of base material 5 only after the base material 5 has exited extrusion device 10. According to one sub-embodiment, extruded sheet 27 is approximately 6-7 millimeters (mm) thick. Thereafter, fabric material 7 is pressed into the surface of extruded sheet 27 using roller 25, thereby forming composite sheet material 30. According to one sub-embodiment, composite sheet material 30 is approximately 4-5 mm thick. As shown in FIG. 4, the composite sheet material 30 has a bottom layer of base material 5 and a thinner top layer into which the fabric material 7 has been embedded.

Figure 5:
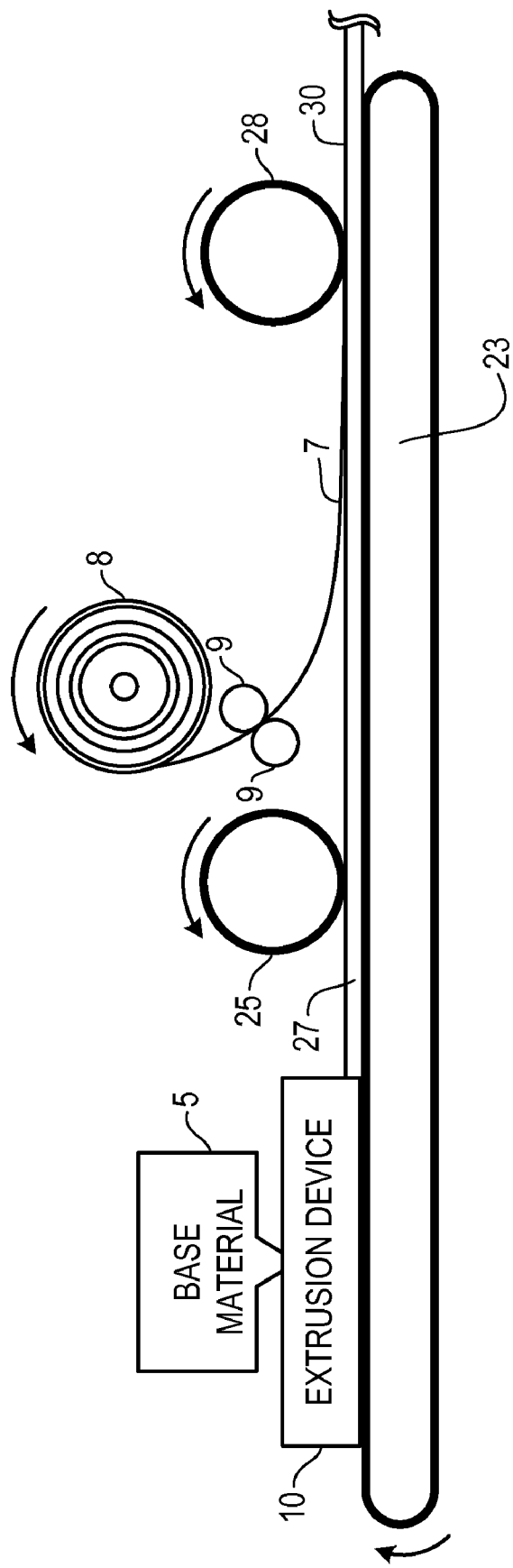
FIG. 5 is a right side conceptual view of a system for making a composite sheet material according to a third representative embodiment of the present invention.

FIG. 5 illustrates another of the embodiments noted above. Here, the extruded sheet 27 of base material 5 first passes underneath roller 25, e.g., for shaping and/or cooling. Only after that is the sheet of fabric material 7 laid on top of extruded sheet 27 and then pressed into sheet 27 by roller 28. However, essentially the same composite sheet material 30 results from this process as resulted from the preceding process. In certain sub-embodiments, extruded sheet 27 is approximately 6-7 mm thick, and composite sheet 30 is approximately 4-5 mm thick.

Alternate embodiments use individual fibers, rather than a sheet of fabric material 7, in a technique similar to that described above. In still further embodiments where individual fibers are to be embedded into the non-fibrous material 5, the fibers may be pre-mixed together with the liquid or semi-liquid base material 5.

Thus, in certain embodiments, individual fibers are sprinkled or sprayed, during the shaping process or afterward (e.g., on the conveyor belt before the non-fibrous material has hardened or has fully hardened). For example, in one representative embodiment where two or more consecutive rollers are being used, the fibers are sprinkled or sprayed between the rollers. Such an embodiment might be implemented where, for example, only one side of the resulting composite sheet material is desired to have a composite surface, and/or one wishes to be sure that the individual fibers form a significant part of the surface area for the resulting composite sheet.

Figure 6:
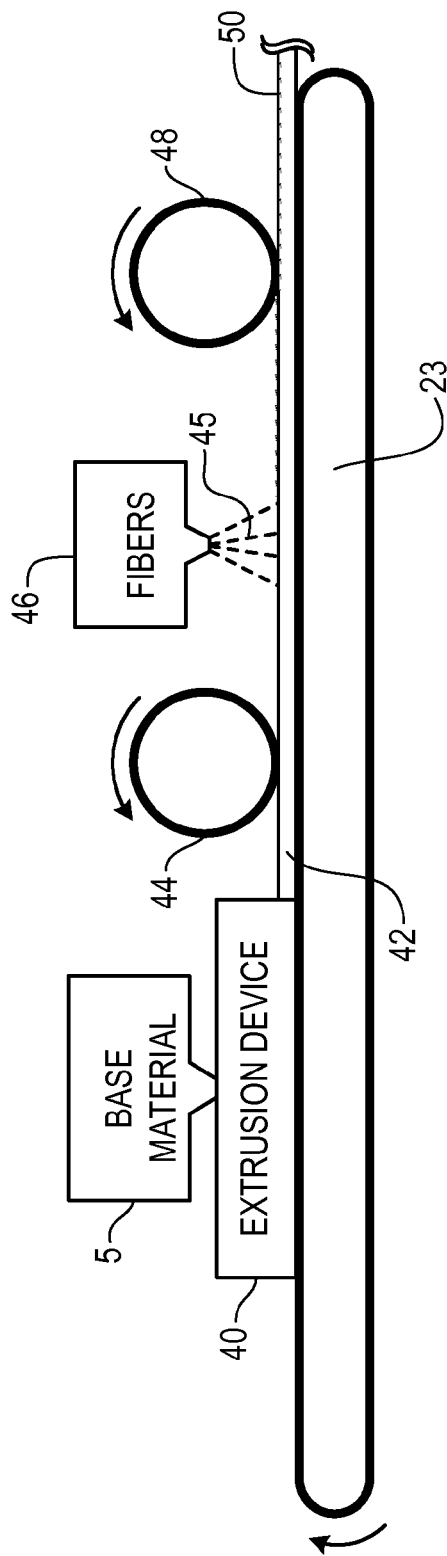
FIG. 6 is a right side conceptual view of a system for making a composite sheet material according to a fourth representative embodiment of the present invention.

An example of such a technique is shown in FIG. 6. Here, a sheet 42, consisting only of base material 5, is extruded by extrusion device 40. Accordingly, this portion of this embodiment is identical to certain conventional extrusion techniques. A first roller 44 then smooths and/or partially cools sheet 42. Thereafter, a number of individual fibers 45 (or, in certain alternate embodiments, other particles, preferably particles of natural materials) are deposited onto the upper surface of sheet 42 by device 46. In this regard, device 46 may be implemented, e.g., as a sprayer or as a sifter. One example of the latter is a container with a sieve for a lower surface, where the container is shaken or vibrated in order to cause the fibers 45 to the sprinkled down onto the surface of sheet 42.

Figure 7:
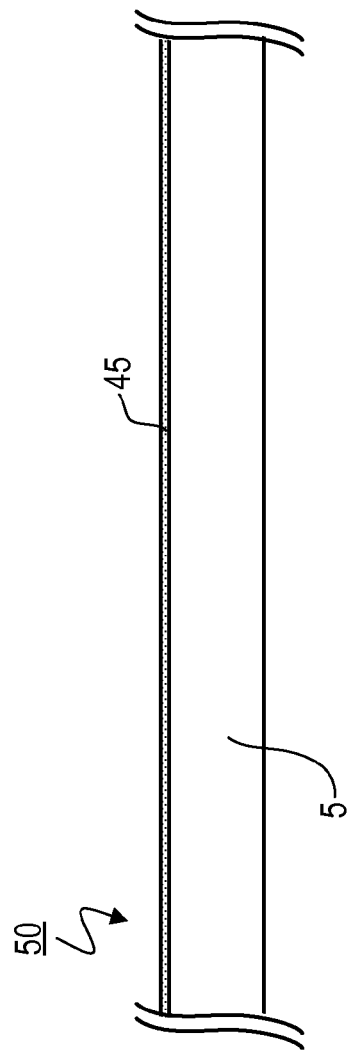
FIG. 7 illustrates a sectional view of a sample composite sheet material according to the fourth representative embodiment of the present invention.

Finally, roller 48 presses the fibers 45 into the surface of sheet 42, resulting in a composite sheet 50, and in some cases simultaneously providing additional cooling. As shown in FIG. 7, sheet 50 has a lower layer that is formed of base material 5 and a thinner upper layer that has fibers 45 embedded within it. In certain sub-embodiments, extruded sheet 42 is approximately 6-7 mm thick, and composite sheet 50 is approximately 4-5 mm thick.

Figure 8:
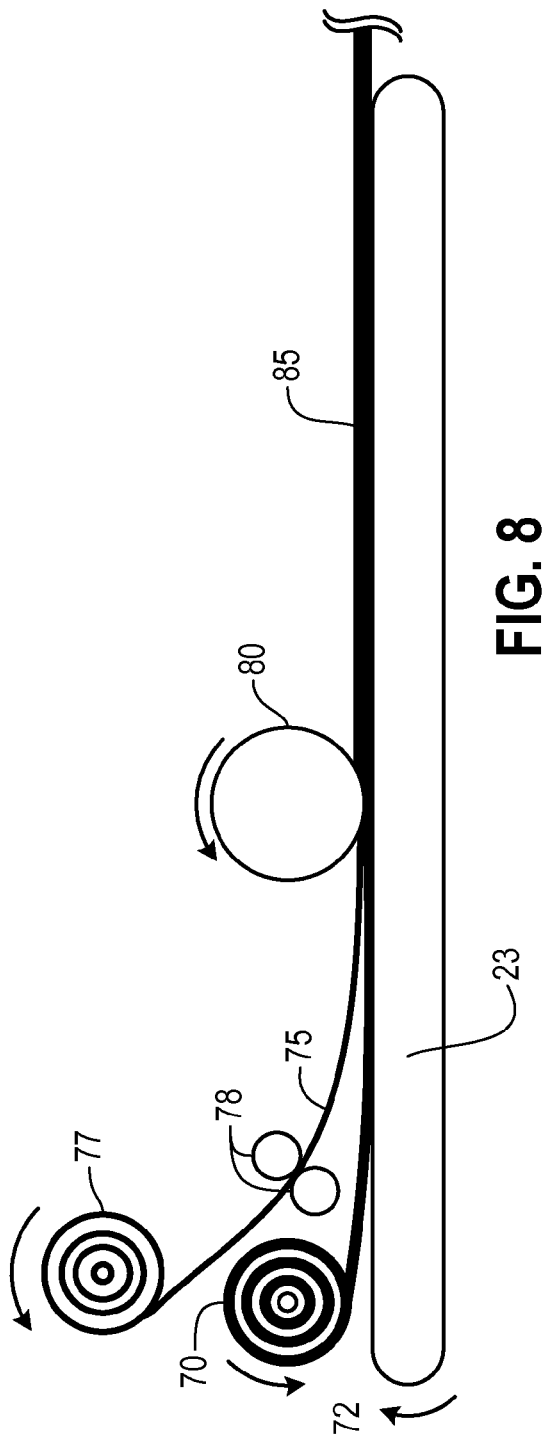
FIG. 8 is a right side conceptual view of a system for making a composite sheet material according to a fifth representative embodiment of the present invention.
Figure 9:
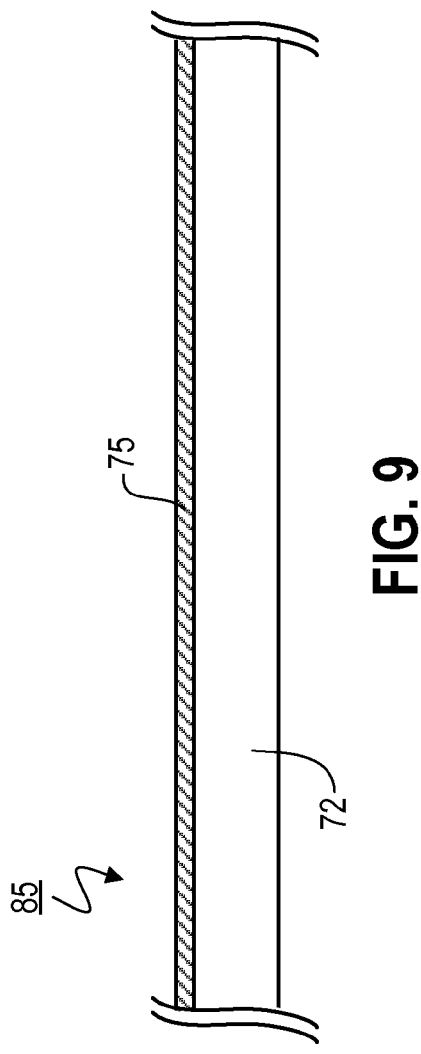
FIG. 9 illustrates a sectional view of a sample composite sheet material according to the fifth representative embodiment of the present invention.

The second general class of embodiments contemplated by the present invention involves the impression of a plurality of individual fibers or a sheet of fabric material into the surface of a pre-manufactured sheet of non-fibrous material. An example is illustrated in FIG. 8.

Preferably, a roll 70 of such pre-manufactured non-fibrous base sheet material 72 (e.g., made from any of the types of base material 5 mentioned above) is first obtained. For example, such sheet material 72 might have been previously fabricated using a conventional extrusion process. A sheet of fabric material 75 (e.g., drawn from a roll 77) is placed on one side (typically the upper side) of the non-fibrous material 72 (e.g., using guiding rollers 78), and the combination of the base sheet material 72 and the fabric sheet material 75 is passed underneath one or more heated rollers 80, which apply heat and pressure, partially melting the surface of the non-fibrous material 72 and causing the fabric material 75 to embed into it, resulting in composite sheet material 85.

A similar technique can be applied by coating the non-fibrous sheet of material with individual fibers (instead of fabric sheet material) and then passing the combination underneath heated rollers 80. Still further, depending upon the type of the non-fibrous sheet material 72, chemical or radiation techniques may be utilized to temporarily soften the surface of the non-fibrous material so that the sheet of fabric material or individual fibers can be embedded into it, or even pressure alone can be used to embed the fibrous material (e.g., fabric sheet material 75 or individual fabric fibers) into the non-fibrous material 72.

In any of the embodiments discussed above, the extrusion die and/or any of the rollers may result in relatively flat surfaces for the resulting sheet material or instead may be shaped so as to form or impress a three-dimensional pattern, such as a tread pattern for embodiments in which the resulting composite sheet material is to be used in a shoe outsole.

Also, in alternate embodiments the fabric or fibrous materials described above may be replaced by various other kinds of materials. For example, sheets or individual particles of leather, reconstituted leather, cork, paper, corn husks, hemp, other organic materials that have long fibers (e.g., for the purpose of adding strength to the finished product for wear improvement), any other plant material, or any other natural or synthetic material (or mixture of materials, such as a composite compound or mixture of organic materials) may be embedded into a sheet of base material 5 or otherwise used to form a composite sheet material using any of the techniques described above.

In some of the embodiments described above, the rollers provide a cooling effect. In other embodiments, e.g., where other types of materials such as one where uncured natural or synthetic rubber is used, the rollers may be heated in order to effect or assist in curing.

Still further, although the embodiments described above contemplate a single layer of fabric or fibers in a single layer of base material 5, in alternate embodiments, multiple (e.g., alternating) layers of such materials may be used. In order to produce a composite sheet material or a finished article having such multiple layers, the techniques described above may be repeated, or individual composite sheets may be joined together, e.g., by gluing, using a vulcanization process or in any of a variety of other ways.

Generally speaking, in the foregoing embodiments only a single side of the non-fibrous base material is embedded with fibrous material. However, in alternate embodiments both sides of the non-fibrous base material are embedded with fibrous material, which may be the same on both sides or different fibrous materials may be used for the two different sides.

Figure 10:
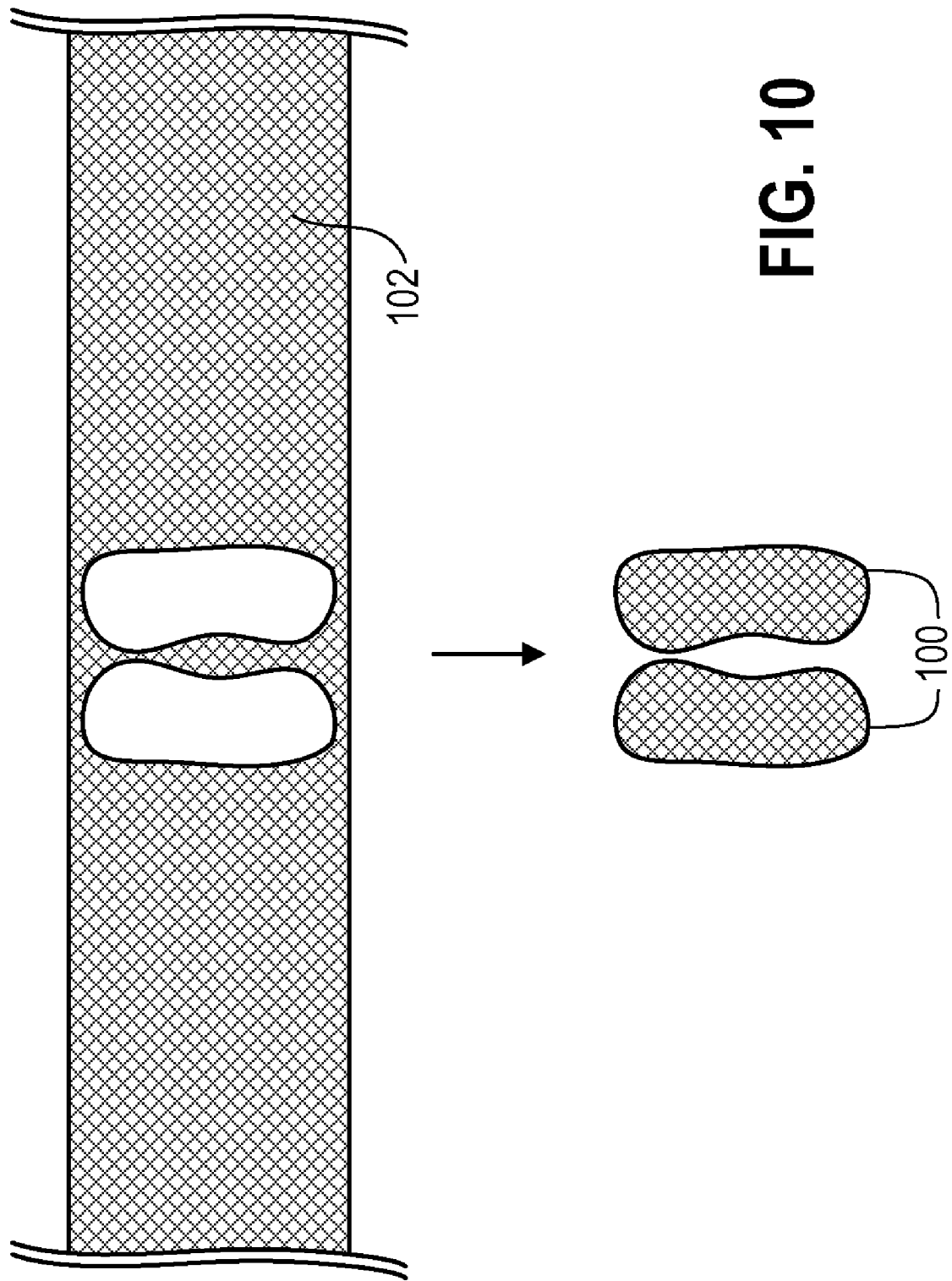
FIG. 10 illustrates the cutting of a shoe outsole from a sheet of composite material.

In any event, once a sheet of composite material has been manufactured in accordance with any of the foregoing techniques, it can be cut into any desired shapes and used for any desired purpose. As noted above, one such purpose is to fabricate the outsole of a shoe. Thus, as shown in FIG. 10, a pair of entire shoe outsoles 100 has been cut from a sheet of composite material 102. Alternatively, one or more portions of a shoe's outsole may be cut from composite sheet material 102 and used in fabricating a shoe's outsole, e.g., by combining such portion(s) with other elements. For instance, in one such embodiment, pieces of a shoe's outsole cut from composite sheet material are attached to a larger section of the shoe's outsole using a vulcanization process.

Additional Considerations.

It is noted that the selection of the fibrous and non-fibrous materials for use in the methods of the present invention preferably depends upon the desired characteristics of the resulting composite material. Although certain specific examples of materials have been provided above, any other materials instead may be used.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of making a shoe outsole, comprising:
   (a) obtaining a piece of uncured base material;
   (b) pressing a sheet of fabric material into a surface of the piece of uncured base material using a roller, thereby forming a sheet of composite material;
   (c) cutting the sheet of composite material into an outsole component; and
   (d) fabricating a shoe outsole using the outsole component, wherein the fabric material is disposed at a surface layer of the sheet of composite material.

2. A method according to claim 1, wherein the base material comprises at least one of: polyvinyl chloride (PVC), acrylonitrile butadiene styrene (ABS), thermoplastic rubber (TPR) and ethylene vinyl acetate (EVA).

3. A method according to claim 1, wherein the base material comprises a polymer.

4. A method according to claim 1, wherein the sheet of fabric material is comprised of a natural fabric material.

5. A method according to claim 1, wherein the piece of uncured base material is a sheet that has been formed by extrusion.

6. A method of making a shoe outsole, comprising:
   (a) obtaining a piece of uncured base material;
   (b) pressing a three-dimensional pattern into a surface of the uncured base material;
   (c) pressing a sheet of fabric material into the surface of the piece of uncured base material after the three-dimensional pattern has been pressed into the surface of the uncured base material, thereby forming a sheet of composite material;
   (d) cutting the sheet of composite material into an outsole component; and
   (e) fabricating a shoe outsole using the outsole component, wherein the fabric material is disposed at a surface layer of the sheet of composite material.

7. A method according to claim 6, wherein the base material comprises at least one of: polyvinyl chloride (PVC), acrylonitrile butadiene styrene (ABS), thermoplastic rubber (TPR) and ethylene vinyl acetate (EVA).

8. A method according to claim 6, wherein the base material comprises a polymer.

9. A method according to claim 6, wherein the sheet of fabric material is comprised of a natural fabric material.

10. A method according to claim 6, wherein the piece of uncured base material is a sheet that has been formed by extrusion.

11. A method according to claim 1, wherein the roller also impresses a three-dimensional pattern into the base material.

12. A method according to claim 11, wherein the three-dimensional pattern is a tread pattern of the shoe outsole.

13. A method according to claim 1, wherein the shoe outsole includes areas where the fabric material contacts the ground.

14. A method according to claim 13, wherein the shoe outsole also includes areas where the base material contacts the ground.

15. A method according to claim 6, wherein the three-dimensional pattern is a tread pattern of the shoe outsole.

16. A method according to claim 6, wherein the shoe outsole includes areas where the fabric material contacts the ground.

17. A method according to claim 16, wherein the shoe outsole also includes areas where the base material contacts the ground.

* * * * *